N. D. LEVIN.
ARMATURE BEARING FOR RAILWAY LOCOMOTIVES.
APPLICATION FILED NOV. 21, 1916.
1,404,306.  Patented Jan. 24, 1922.
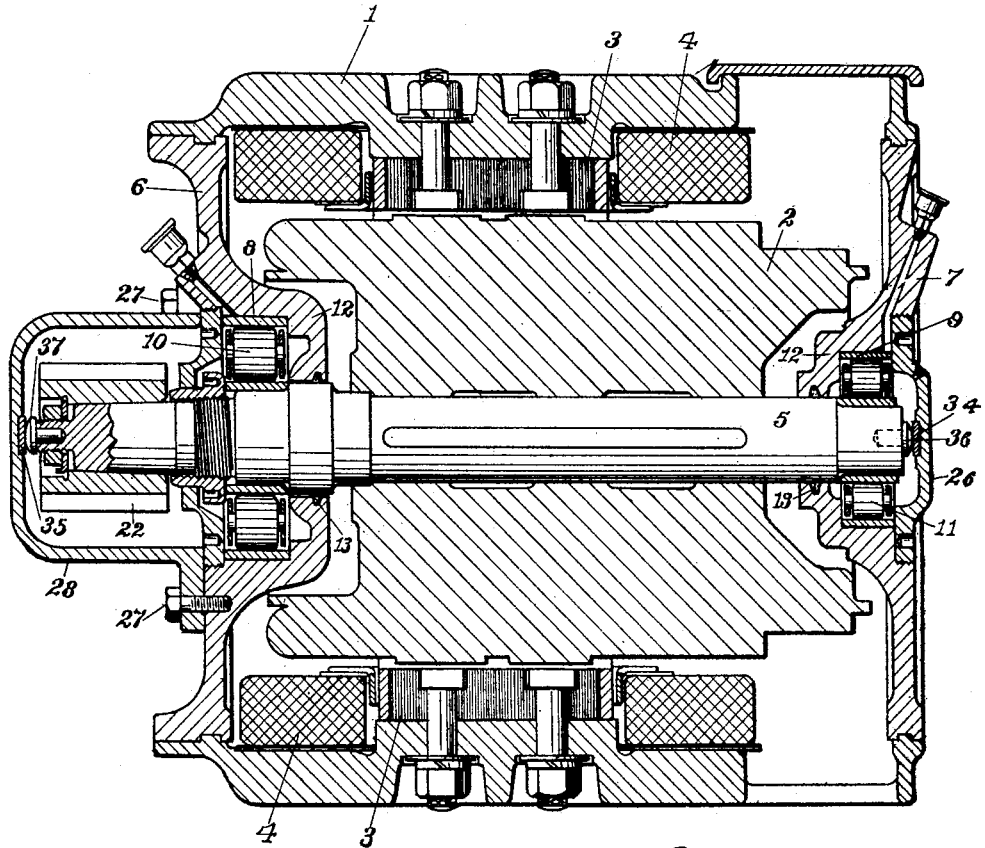
Fig. 2.
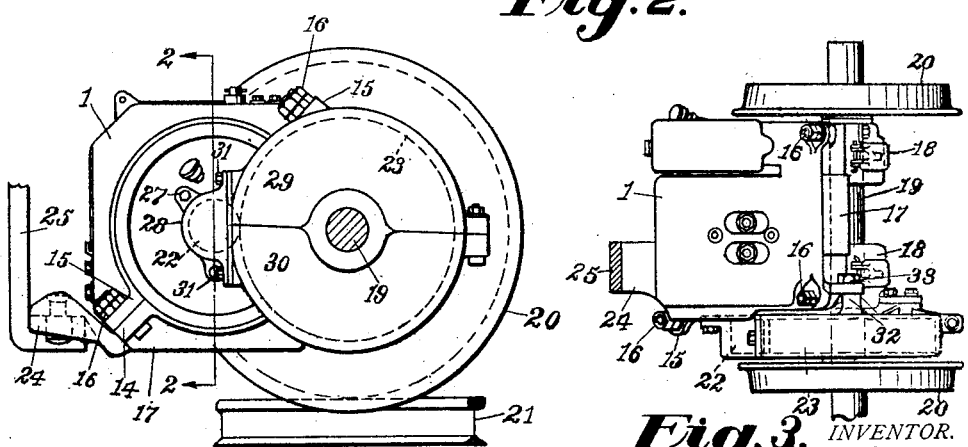
Fig. 1.
Fig. 3.
WITNESSES:
Harry E. Dean
Dudley T. Fisher
INVENTOR.
Nils D. Levin
BY H. H. Bliss
ATTORNEY.

UNITED STATES PATENT OFFICE.

NILS D. LEVIN, OF COLUMBUS, OHIO, ASSIGNOR TO THE JEFFREY MANUFACTURING COMPANY, OF COLUMBUS, OHIO, A CORPORATION OF OHIO.

ARMATURE BEARING FOR RAILWAY LOCOMOTIVES.

1,404,306.  Specification of Letters Patent.  Patented Jan. 24, 1922.

Application filed November 21, 1916. Serial No. 132,685.

*To all whom it may concern:*

Be it known that I, NILS D. LEVIN, a citizen of the United States, residing at Columbus, in the county of Franklin and the State of Ohio, have invented certain new and useful Improvements in Armature Bearings for Railway Locomotives, of which the following is a specification, reference being had therein to the accompanying drawing.

The present invention relates to certain new and useful improvements in electric railway locomotives and particularly to locomotives of the class in which each has one or more motors, each of which is supported upon the axle of a locomotive and is positioned between the inner faces of the driving track wheels.

In each of the locomotives of the class to which this invention relates the armature shaft is subject to excessive longitudinal thrusts due to the surgings of the locomotive because of irregularities in the track. This is especially true where the locomotives pass around curves of short radii such as are frequently found in mines. The space between the inner faces of the driving wheels is very limited, yet the motors must be expanded both axially and vertically, in order to provide sufficient motor metal to furnish power for the work to be done. The space referred to for the motor when the latter is properly constructed for power is too small to admit of the use of ball or roller thrust bearings, and permit the frequent access to the bearing chambers.

The object of the invention is to provide, in a locomotive of the class described, a motor having thrust bearings and holding devices of a novel construction which are capable of withstanding the excessive strains of the railway service and which can be placed in the aforesaid limited space between the driving wheels and permit access to the bearings whenever required.

The devices by which I attain this object are fully set forth in the following specification and illustrated in the accompanying drawing of which:

Fig. 1 is a longitudinal section taken along the vertical central plane of an electric motor equipped with the devices of my invention.

Fig. 2 is an end elevation of the motor illustrated in Fig. 1. Mounted upon the axle of a locomotive one of the driving wheels being broken away to reveal the motor.

Fig. 3 is a plan view showing the relation of the motor to the wheels and axles.

Like numerals refer to similar parts in the several figures.

In the drawing numeral 1 indicates the field frame and 2 the armature of a railway electric motor. The field frame is provided with magnetic poles 3 and field coils 4 in the manner common to such motors. The armature 2 is of the usual construction and is attached to and supported by the armature shaft 5. Fitted in the ends of the field frame 1 are end bearing castings 6 and 7 having recesses 8 and 9 to support the roller bearings 10 and 11 in which the armature shaft 5 is mounted. Formed on the end bearings casting are inwardly extending flanges 12 which closely approach the shaft 5 and in these flanges are formed annular grooves into which are fitted felt washers 13 which close the space between the shaft 5 and flanges 12 to exclude oil and dust from the interior of the motor. For convenience of assembly and inspection the field frame 1 is divided along a diagonal transverse plane, the two parts being provided with abutting flanges 14 and 15 clamped together by suitable bolts 16. Formed on the lower half 17 of the field frame 1 are journal bearings 18 adapted to bear upon the axle 19 of the locomotive to support the weight of the motor. To the axle 19 is attached the driving wheels 20 adapted to support the locomotive upon the track rails 21. The armature shaft 5 is extended beyond the bearing 10 and to this shaft extension is attached a spur pinion 22 which engages with the spur gear 23 attached to the axle 19 to rotate the driving wheels 20 to propel the locomotive. Formed on the lower half 17 of the motor frame 1 is a lug 24 which engages the abutment 25 of the frame of the locomotive to prevent the rotation of the motor about the axle 19. Screw threaded into the end bearing casting 7 at the end of the motor opposite the armature pinion is a closure plate 26 by which the bearing recess 9 is closed against the admission of dust to the bearing 11 or the escape of lubricant therefrom. Secured to the gear end bearing 6 by suitable machine screws 27 is a stirrup member 28 abutting upon the gear case sections 29 and 30 to which it is attached by suitable machine screws 31, the three parts thus united forming a gear case which completely surrounds and protects the gears 22 and 23. The gear case section 29 is further supported by a lug 32 of the motor frame 1 to which it is attached by the machine screw 33.

In locomotives adapted to use on the narrow gauge track of coal mines and the like the space between the driving wheel 20 is so small that great difficulty has been experienced in designing motor of suitable capacity within the allowable dimension. By the use of roller bearings arranged to extend into recesses of the ends of the armature the radial thrust of the armature have been very satisfactorily provided for. Such bearings, however, make no provisions for the longitudinal thrust of the armature which, under conditions encountered in locomotive service, are very considerable. To meet these conditions I have provided recesses in the cover plate 26 and stirrup member 28 in which are inserted steel plates 34 and 35 adapted to engage with the end of hardened steel pins 36 and 37 set in the ends of the armature shaft 5, thereby limiting the longitudinal movement of the armature shaft.

The end walls 6 and 7 of the motor are positioned so close to the inner faces of the driving wheels that it is impossible to fasten in place bearings of the ordinary sorts. They require the use of bolts which are moved longitudinally axially of the motor when they are being inserted or withdrawn. If they are long enough to be effective in holding in place the separable parts, they cannot be engaged by tools and drawn entirely outward.

With the devices shown it is merely necessary to loosen the closure plate 26 which is threaded on its periphery and secured by the threads in the large aperture in the end wall. By a simple spanner wrench this closure cap can be turned sufficiently to remove it to permit access to the bearing chamber. After a new wearing plate or new thrust pin has been inserted, the closure cap can be as readily replaced. This element therefore, although occupying but little space, axially, serves the several purposes of a lubricant holder, a retainer for the ball bearings, an abutment device for the heavy thrusts of the armature, and a holder for the hardened thrust-taking elements which receive the thrust of the armature shaft.

By the arrangements of parts above described, I have provided adequate means for limiting the longitudinal movement of the armature of a railway electric motor such as may be placed in the limited space available between the driving wheels of the locomotives and which may be readily renewed when worn or otherwise injured.

The outer surface of the disc plate 7 and closure 26, that is of the end part of the motor adjacent the track wheel is approximately flat, there being no lateral projections at the axial central line so that this part of the motor can be brought close to the said wheel.

The end disk plate 7, together with the parts connected to it, can be withdrawn from the end of the shaft 5 as a unitary assemblage, after the upper part of the field is lifted and the armature is slightly elevated, permitting cleaning and repairing whenever necessary without separating the minor parts from each other.

What I claim is—

In an electric locomotive having a driving axle, track wheels rigidly attached thereto, an electric motor hinged to the axle with its end plates close to the inner faces of the track wheels, the combination with the field magnet the detachable end plate 7 closing the chamber in the field and separable therefrom and formed with the inwardly extending internal bearing support 12, and with a relatively large aperture having a threaded edge and the roller bearings mounted in the said detachable end plate, of the flat imperforate closure plate detachably secured in the threaded aperture and provided with a removable bearing plate, the armature axle having its journal part mounted in the roller bearing and provided with a detachable thrust pin 36 arranged to bear against the said wearing plate in the threaded cap.

In testimony whereof I affix my signature, in the presence of two witnesses.

NILS D. LEVIN.

Witnesses:
 DUDLEY T. FISHER,
 HARRY C. DEAN.